United States Patent
Pfeil et al.

(10) Patent No.: US 9,914,578 B2
(45) Date of Patent: Mar. 13, 2018

(54) PACKAGING FOR MULTI-COMPONENT ADHESIVE SYSTEM

(71) Applicant: Hilti Aktiengesellschaft, Schaan (LI)

(72) Inventors: Armin Pfeil, Kaufering (DE); Frank Thiemann, Landsberg/Lech (DE)

(73) Assignee: HILTI AKTIENGESELLSCHAFT, Schaan (LI)

( * ) Notice: Subject to any disclaimer, the term of this patent is extended or adjusted under 35 U.S.C. 154(b) by 402 days.

(21) Appl. No.: 14/695,851

(22) Filed: Apr. 24, 2015

(65) Prior Publication Data

US 2015/0232253 A1 Aug. 20, 2015

Related U.S. Application Data

(63) Continuation of application No. PCT/EP2013/072035, filed on Oct. 22, 2013.

(30) Foreign Application Priority Data

Oct. 24, 2012 (DE) .................. 10 2012 219 480

(51) Int. Cl.
  *B65D 69/00* (2006.01)
  *B65D 25/08* (2006.01)
  *B65D 81/32* (2006.01)
  *B65D 77/00* (2006.01)
  *B65D 77/22* (2006.01)

(52) U.S. Cl.
  CPC ....... *B65D 81/3261* (2013.01); *B65D 77/003* (2013.01); *B65D 77/22* (2013.01); *B65D 81/32* (2013.01)

(58) Field of Classification Search
  CPC ...... B65D 77/003; B65D 77/22; B65D 81/32; B65D 81/3261; B65D 88/1643
  USPC ....... 206/219–222, 524.1, 568; 523/456, 458
  See application file for complete search history.

(56) References Cited

U.S. PATENT DOCUMENTS

| | | | | |
|---|---|---|---|---|
| 3,782,600 A * | 1/1974 | Columbus | .......... | B65D 81/3288 206/221 |
| 5,083,674 A * | 1/1992 | Clark | ................. | B65D 81/3205 156/69 |
| 5,287,961 A * | 2/1994 | Herran | ............... | B65D 81/3266 206/219 |
| 5,333,737 A * | 8/1994 | Clark | .................... | B65D 81/32 206/219 |
| 5,551,805 A * | 9/1996 | Arnold | ..................... | C08J 3/241 206/219 |
| 6,065,643 A * | 5/2000 | Harvey | .............. | B65D 81/3288 222/94 |
| 8,100,295 B2 * | 1/2012 | Keller | ............... | B05C 17/00506 222/137 |
| 2002/0112984 A1* | 8/2002 | Moran | ................. | B65D 77/065 206/569 |
| 2004/0068044 A1* | 4/2004 | Udding | ................. | C08F 283/00 524/556 |
| 2011/0201726 A1* | 8/2011 | Pfeil | ....................... | C04B 26/04 523/456 |

FOREIGN PATENT DOCUMENTS

| | | |
|---|---|---|
| CN | 102190458 A | 9/2011 |
| EP | 2357162 | 8/2011 |
| JP | 2011-162787 A | 8/2011 |
| JP | 162787 A1 | 12/2011 |
| WO | 9419397 | 9/1994 |
| WO | 098561 A1 | 8/2011 |
| WO | WO 2011/098561 A1 | 8/2011 |

OTHER PUBLICATIONS

Office Action dated Apr. 5, 2017 in Japanese Patent Application No. 2015-538406 with partial English language translation.
International Search Report for PCT/EP2013/072035, dated Feb. 6, 2014. (9 pages).
Chinese Office Action, Application No. 201380062470.4, dated Apr. 28, 2016.
Japanese Office Action, Application No. 2015-538406, dated Jul. 6, 2016.

* cited by examiner

*Primary Examiner* — Luan K Bui
(74) *Attorney, Agent, or Firm* — Grüneberg and Myers PLLC

(57) ABSTRACT

A packaging for multi-component adhesives comprises (1) a first section which contains at least three individual components of the multi-component adhesive and (2) a second section which contains at least two individual components of the multi-component adhesive. The individual components of the multi-component adhesive are distributed to the two sections in such a way that a reaction between the individual components is prevented and hardening of the adhesive takes place only after complete mixture of the individual components. This makes stable storage of the components possible.

17 Claims, No Drawings

PACKAGING FOR MULTI-COMPONENT ADHESIVE SYSTEM

RELATED APPLICATIONS

This application claims priority to, and is a continuation of PCT/EP2013/072035, filed Oct. 22, 2013, and which claims priority to DE 10 2012 219 480.0, having a filing date of Oct. 24, 2012, which is also incorporated herein by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The invention concerns packaging for storing components of a multi-component adhesive stored separately from one another, in particular a three-component packaging for storing a mortar system based on a dual-hardening adhesive.

The use of reactive resin materials based on unsaturated polyester resins, vinyl esters, or epoxy resins as glues and adhesives for chemical fastening technology has long been known. These are two-component systems, one component containing the reactive resin, and the other component containing the hardening agent. Other usual components such as fillers, accelerators, stabilizers, and solvents including reactive solvents (reactive thinners) can be included in one and/or the other component. Then the reaction with the formation of a hardened product is set in motion by mixing the two components.

Usually, multi-component materials, such as, for example, mortar materials, foam materials, and sealing materials, are made available to the user as two-component or multi-component materials in cartouches, cartridges, and film-wrapped packs as injection systems. Film-wrapped packs have proved to be useful as packaging for such materials and, in particular, in comparison with cartridges, are characterized by the small amount of material that has to be discarded after the material is applied. In addition, film-wrapped packs are easy and economical to manufacture.

Basically, two systems are used in chemical fastening technology: one based on radically polymerizable, ethylenically unsaturated compounds, which as a rule are hardened with peroxides, and one based on an epoxy-amine system. The first system is characterized by rapid hardening, in particular at low temperatures such as −10° C., but has weaknesses in the load values. As opposed to this, the epoxy-amine systems do have a slower hardening rate, but are advantageous with respect to the load values and the robustness of the system.

Dual-hardening adhesives are being developed in order to combine the advantages of both systems. This means systems, the hardening of which takes place both radically and by polyaddition. These are also called hybrid systems or hybrid adhesives. These hybrid systems are based on resin compositions that contain compounds hardenable according to the first reaction type, for example, radically polymerizable compounds, and compounds polymerizable by polyaddition, for example epoxies, hardenable according to a second reaction type, different from the first reaction type. It is possible to harden a resin composition based on a radically polymerizable compound and an epoxy, for example, with a peroxide and an amine, it being possible for the radical hardening reaction to be accelerated with a transition metal compound.

A system of this kind is described in the unpublished application EP1021532.

However, systems that contain, in addition to the radically polymerizable part, a part that leads to a polyurethane or polyurea, such as, for example interpenetrating polymer networks (IPNs) based on polymethacrylates and polyurethanes, as glues and the like, also are known.

It is usual to divide two-component adhesives so that the resin component, which contains the reactive compound, if necessary, further additives and fillers, such as reactive thinners, inhibitors, accelerators, thickeners, thixotropic agents, and inorganic fillers, and the hardener component, which contains the hardening agent and, if necessary, further additives and fillers, such as thickening agents, thixotropic agents, phlegmatizing agents, and inorganic fillers, are packaged spatially separated so that a reaction takes place only when the two components are mixed with one another. In case of film bags used as packaging, the resin component is packaged in a first film bag and the resin component is packaged in a second film bag spatially separated from the first bag. This is similar to the situation for the cartridges also used, a smaller cartridge, which contains the hardener component, being located in a larger cartridge, which contains the resin component. In case of a cartouche as packaging, this usually contains two separate chambers, in order to achieve spatial separation of the components.

For a hybrid adhesive, as is described in the application EP10153243, in a usual two-bag injection system, the resin component, which is contained in a film bag, would contain the radically hardenable compound, the compound hardenable with an amine, catalysts, accelerator, if necessary reactive thinners, inhibitors, and a compound for bridge formation. Then the hardener component would contain the two hardening agents, the peroxide, and the amine.

Of course, this leads to some problems. On the hardener side, there is the problem that only a few peroxides and amine can be combined briefly storage-stable, that is, there is no flexibility with respect to the choice, in particular of the amine hardener for the epoxy resin. Further, it is not possible to ensure sufficient storage stability, even in case of those hardening agents that can be combined with one another. This invariably leads to an unpredictable impairment of the hardening and the performance of the adhesive, that is, the bonding strength of the anchoring elements.

However, on the resin side, problems based on reaction of the individual components with one another also can be expected.

Compounds that delay radical polymerization often are added to the resins or the resin components in order to make them storage-stable and/or to adjust the gel time. 4-hydrozy-2,2,6,6-tetramethyl piperidine-1-oxol (Tempol) is a common and proved compound. The literature (e.g. Sheldon et al., Org. Biomol. Chem., 2003, 1, 3232; E. G. Rozantsev et al., Russ. Chem. Rev., 1971, 40 (3), 233) contains information that Tempol reacts with Cu(I) and Cu (II) salts, which are used, among other things, as catalysts for the activation of the peroxide hardener in particular in the presence of atmospheric air. This decomposition reaction is also assumed for other stable nitroxyl radicals.

Thus, in case of packaging the package for hybrid adhesives, in particular according to EP10153243, it is necessary to pay attention to the fact that the following components may not be combined with one another, in order not to negatively influence either the storage stability or the hardening time, as well as the performance of the adhesive:

the peroxide and the amine,
the Tempol and the radically polymerizable compound,
the amine and the epoxy compound, and
the radically polymerizable compound and the amine.

With respect to the packaging, the individual components must also be separated so that the required amount ratios, in particular the mixing ratio of hardenable compound to hardening agent, are maintained at the time of applying the adhesive, for example at the time of pressing out the individual components.

For the use on site, this means that the resin composition, the peroxide hardener, the amine hardener, as well as the accelerator must be kept spatially separated so that an unintended reaction, that is, either hardening of the resin composition or inactivation of the other components as described above, with one another is prevented. The difficulty now consists in packaging a multi-component, dual-hardening adhesive (hybrid adhesive) so that a reaction of the individual components with one another is prevented, and the adhesive can be easily used on site, for example in conventional glass or plastic cartridges or frequently used dispensing devices for two-component adhesives. Such a packaging is currently not known.

However, even in hybrid adhesives, that have a system that, for example, leads to polyurethanes or polyureas, instead of the epoxy-amine system, the individual components are not arbitrarily miscible, especially since amines also are required for systems with polyureas.

BRIEF SUMMARY OF THE INVENTION

A multi-component adhesive for use in the present packaging can include (I) a resin component and (II) a hardening component. The resin component can include (a) at least one radically polymerizable compound, (b) at least one compound polymerizable by polyaddition, (c) at least one accelerator, (d) if necessary at least one inhibitor and (e) if necessary at least one compound with two functional groups, of which one can (co)polymerize radically and the other by polyaddition. The hardening component can include (A) at least one hardening agent for the polyaddition and (B) at least one radical initiator.

In one embodiment, a packaging for multi-component adhesives comprises a first section A1, which contains at least three individual components of the multi-component adhesive and a second section A2 located separate from this, which contains at least two individual components of the multi-component adhesive. The individual components of the multi-component adhesive being divided into the two sections A1 and A2 in such a way that hardening of the adhesive takes place only after the complete mixing of the individual components and a reaction between the individual components is prevented.

In one example, the first section A1 can contain (a) at least one radically polymerizable compound, (c) at least one accelerator, (A) at least one hardening agent for the polyaddition, (d) if necessary at least one inhibitor, and (e) if necessary at least one compound with two functional groups, of which one can (co)polymerize radically and the other by polyaddition.

In another example, the second section A2 can contain (b) at least one compound polymerizable by polyaddition, and (B) at least one radical initiator.

In yet another example, the packaging can have at least three individual components of the multi-component mortar system being provided in the first section A1 in separate chambers K1 and K2. The first chamber K1 can contain (a) at least one radically polymerizable compound, (d) if necessary at least one inhibitor, and (e) if necessary at least one compound with two functional groups, of which one can (co)polymerize radically and the other by polyaddition. The second chamber K2 can contain (A) the hardening agent for the polyaddition, and (c) at least one accelerator. The first chamber K1 of the first section can further contain at least one more reactive thinner for the radically polymerizable compound.

In another example, the mixing ratio of the first section A1 to the second section A2 A1:A2 can be between 1:1 and 10:1. In another example, it can be 3:1 or 5:1.

In another example, the mixing ratio of the first chamber K1 to the second chamber K2 can be 4:1 to 1:4. In another example, it can be 4:1 to 1:1.

In another example, the at least one compound (b) polymerizable by polyaddition can be an epoxy compound, the at least one hardening agent for the polyaddition (A) can be an amine, and if necessary the compound with two functional groups (e) can be a compound with two functional groups, of which one can radically (co)polymerize and the other being an epoxy group.

The pack can be a film-wrapped pack with a first film bag Fb1 and a second film bag Fb2. In one example, a head part with at least two mounting sections in each case for one end of a film bag is further provided on the film-wrapped pack.

BRIEF DESCRIPTION OF SEVERAL VIEWS OF THE DRAWINGS

[Not Applicable]

DETAILED DESCRIPTION OF THE INVENTION

The object of the invention is to provide a packaging for multi-component adhesive systems, in particular for hybrid adhesives of the initially mentioned kind, which enables stable storage, can be used in already used conventional dispensing devices, and the required mixing ratios of hardenable compounds to hardening agent are maintained.

The object is achieved by the packaging described and claims herein.

One advantage of the invention is that in the case of using a hybrid adhesive based on one resin component hardenable with peroxides and one resin component hardenable with amines, any peroxides and any amines can be used, so that great flexibility in the formulation of the two hardening systems is obtained and any amount of radical catcher(s) can be chosen, in order to be able to freely adjust the gel time individually according to the requirements.

Moreover, the invention makes it possible to use greater absolute amounts of peroxide, without the portion of the peroxide with respect to the hardener component exceeding the legal limiting value of 1% by weight. Thus, even in case of high absolution amounts of peroxide, if necessary the packaging no longer has to be labeled as "oxidizing", which leads to higher user acceptance.

A further advantage of the invention is that, as compared with the conventional two-component systems based on radically hardenable resins and based on epoxy resins, in case of which a phlegmatizing agent is added to the hardener component (peroxide) for increasing the storage stability, the epoxy resin serves as phlegmatizing agent, so that it is possible to omit an additional addition of phlegmatizing agents, since these phlegmatizing agents can impair the mechanical properties of the hardened material, and are frequently classified as environmentally hazardous.

In the sense of the invention, "hybrid adhesive" or "dual-hardening adhesive" means an adhesive composition, which contains a hardening mixture based on a radically polymerizable compound together with a hardening agent for the radical polymerization, the radical initiator, and a resin mixture based on a compound polymerizable by polyaddition together with a hardening agent for the polyaddition. The individual components of the two resin mixtures, namely the radically polymerizable compound, the compound polymerizable by polyaddition, the hardening agent, the accelerator, the inhibitor, if necessary the compound for bridging (compound with two functional groups, of which one can be polymerized radically and the other by polyaddition), the reactive thinner, the additive, and fillers are designated as "individual components" in the sense of the invention. Further, a "stabilizer" is a compound, which slows, inhibits, or prevents the hardening reaction, in particular the radical polymerization, the compound being added in such an amount of the radically polymerizable compound that the resin mixture is storage-stable, but the gel time is not impaired during the hardening. On the other hand, an "inhibitor" is a compound, which slows, inhibits, or prevents the hardening reaction, in particular the radical polymerization. However, this is added in such an amount to the radically polymerizable compound that the gel time is prolonged during the hardening, compared with the hardening mixture without inhibitor. Therefore, a compound can be both stabilizer and inhibitor. However, different compounds can also be used.

The subject matter of the invention is packaging for multi-component adhesives, which include (i) a resin component with (a) at least a radically polymerizable compound, (b) at least one compound polymerizable by polyaddition, (c) an accelerator, if necessary (d) at least one inhibitor and if necessary (e) at least one compound with two functional groups, of which one can (co)polymerize radically and the other by polyaddition, and (ii) a hardening component with (A) at least one hardening agent for the polyaddition and (B) at least one radical initiator, characterized by a first section A1, which contains at least three individual components of the multi-component adhesive, and a second section A2, which contains at least two individual components of the multi-component adhesive, the individual components of the multi-component adhesive being distributed to the two sections A1 and A2, in such a way that hardening of the adhesive takes place only after complete mixture of the individual components and a premature reaction between the individual components is prevented.

The two sections A1 and A2 of the packaging can be made as partial areas of a container separated from one another, the separation taking place by means of a partition and the like, or a second independent container, which is located in the first container, or as independent, spatially separated containers.

According to the invention, ethylenically unsaturated compounds, cyclic monomers, compounds with carbon-carbon-triple bonds, and thiol-yne/ene resins, as are known to the expert, are suited as radically polymerizable compounds.

Of these compounds, preference is given to the group of the ethylenically unsaturated compounds, which includes styrene and derivatives thereof, (meth)acrylates, vinyl esters, unsaturated polyesters, vinyl ethers, allyl ethers, itaconates, dicyclopentadiene compounds, and unsaturated fats, of which unsaturated polyester resins and vinyl ester resins are particularly suited and, for example, are described in the applications EP 1 935 860 A1, DE 195 31 649 A1, and WO 10/108939 A1. Vinyl ester resins are most preferred here because of their stability and exceptional mechanical properties.

In the sense of the invention, vinyl ester resins are oligomers or polymers with at least one (meth)acrylate terminal group, so-called (meth)acrylate functionalized resins, which also include urethane(meth)acrylate resins and epoxy(meth)acrylates.

Vinyl ester resins, that have unsaturated groups only in terminal position, are, for example, obtained by reaction of epoxy oligomers or polymers (e.g. bisphenol A-diglycidyl ether, epoxies of phenol-novolak type, or epoxy oligomers based on tetrabromobisphenol A) with, for example, (meth) acrylic acid or (meth)acryl amide. Preferred vinyl ester resins are (meth)acrylate-functionalized resins and resins that are obtained by reaction of an epoxy oligomer or polymer with methacrylic acid or methacryl amide, preferably with methacrylic acid. Examples of such compounds are known from the applications U.S. Pat. No. 3,297,7345 A, U.S. Pat. No. 3,772,404 A, U.S. Pat. No. 4,618,658 A, GB 2217722, DE 3744390 A1, and DE 4131457 A1.

The radical starters usually used and known to the expert can be used as radical initiators. Compounds that can initiate the polymerization at room temperature are preferred, a peroxide radical initiator being especially preferred.

The compounds usually used and known to the expert are suited as compounds that can polymerize by polyaddition. For example, epoxies, isocyanates, β-ketoesters, such as acetoacetates, cyclocarbonates, and enes, that is, electron-poor carbon-carbon-double bonds, are named, it being possible for the compounds to have at least one, preferably two or more of the functional groups. Epoxy compounds are preferred, and epoxy compounds with at least two epoxy groups per molecule are more preferred. Correspondingly, compounds that contain active hydrogen atoms and are not ionic can be used as hardening agents for the polyaddition. For example, amines, alcohols, and thiols can be named, it being possible for the compounds to have at least one, preferably two or more amino-, thio-, or hydroxyl-groups per molecule. Amines are preferred and amines with at least two amino groups per molecule are more preferred.

If an ene compound is used as a compound that can polymerized by polyaddition, both the radical polymerization and the polyaddition can proceed in parallel, if the ene compound is electrophilically sufficient. This has the advantage that only one compound has to be used as resin component and thus fewer difficulties are expected at the time of packaging of a hybrid adhesive of this kind.

The nature of the hybrid adhesive can be influenced and correspondingly adjusted for the desired use by the choice of the compound, which can polymerize by polyaddition.

In a preferred embodiment of the invention, the compound polymerizable by polyaddition is an epoxy compound and the corresponding hardening agent (A) is an amine. For the case that the hybrid adhesive contains a compound with two functional groups, of which one can (co)polymerize radically and the other by polyaddition, the functional group, which can polymerize by polyaddition, is an epoxy group.

The compounds usually used and known to the expert can be used as accelerators and inhibitors depending on the area of application of the hybrid adhesive. For example, amines, preferably tertiary amines and/or metal salts are suitable accelerators. For example, the inhibitors usually used for radically polymerizable compounds, such as phenolic and non-phenolic compounds, e.g. stable radicals, such as galvinoxyl- and N-oxyl-radicals, and/or phenothiazines, are suitable inhibitors.

The compounds described in the application EP10153243, the content of which is herewith accepted in this application, are referred to for applications in the area of fastening technology, for example as reaction resin mortar.

Preferably the first section A1 contains (a) at least one radically polymerizable compound, (c) at least one accelerator, (A) at least one hardening agent for the polyaddition, if necessary (d) at least one inhibitor and if necessary (e) at least one compound with two functional groups, of which one can (c) polymerize radically and the other by polyaddition. Thus, (A) the hardening agent for the polyaddition and (B) the radical initiator are stored separately from one another and the multi-component adhesive is not limited to specific combinations of radical initiators such as peroxides, not reacting with one another, and hardening agents for the polyaddition, such as amines, as well as to specific amounts of individual components. The result of this is that any radical initiators and any hardening agents can be used for the polyaddition, corresponding to the desired properties of the adhesives. Both the hardening agent for the polyaddition as well as for the radical initiation can be present as mixtures of several compounds. Correspondingly, great flexibility is assured in the formulation of the hardener.

The second section A2 correspondingly contains (b) at least one compound polymerizable by polyaddition and (B) at least one radical initiator. In case of an epoxy-amine based system, contains a peroxide as radical initiator, in this way it is possible to achieve a phlegmatizing of the peroxide, which has a positive effect on the storage stability. Since the epoxy compound has more volume than the amine, greater absolute peroxide amounts can be packaged and the peroxide portion still amounts to less than the 1% that must be labeled, so that labeling, at least with respect to the peroxide, is no longer necessary. This leads to greater customer acceptance.

The at least three individual components (a), (c) and (A), and, if present, (d) and (e) of the multi-component adhesive preferably are provided in the first section A1 in separate chambers, in order to achieve a further separate storage of individual components reacting with one another.

The chambers here can be made as partial areas of a container or as independent, spatially separated containers similarly as in the case of the sections.

It has proved to be advantageous here to divide the individual components in the first section A1, so that the first chamber K1 (a) contains at least one radically polymerizable compound and if necessary (d) at least one inhibitor and if necessary (e) at least one compound with two functional groups, of which one can (co) polymerize radically and the other by polyaddition, and the second chamber K2 (A) contains at least one hardening agent for the polyaddition and (c) at least one accelerator. Therefore, if an inhibitor is present, a reaction between the accelerator (c) and the inhibitor (d) is no longer possible, so that unfavorable effects on the storage stability, which originate from this reaction, and the gel time drift connected therewith, can be avoided. Further, it is possible to use accelerator and inhibitors that are not compatible with one another.

For example, metal salts, such as Cu(II) salts, can be used as accelerators and stable nitroxyl radicals, such as Tempol, can be used as inhibitors in a multi-component adhesive, without this resulting in decomposition of the nitroxyl radical by the metal salt. The concentration of the nitroxyl radical used is variable, so that the gel time of the radically hardening components can be freely adjusted corresponding to the requirements of the hybrid hardener. Moreover, it is possible to used other inhibitors that are, for example, not compatible with the Cu (II) salt, such as phenols or catechols, instead of, or in addition to, the nitroxyl radical.

A further advantage is that an additional preactivation of the accelerator can be achieved by the combination of (c) accelerator (e.g. Cu (II) naphthenate) and (A) hardening agent for the polyaddition (e.g. amine). It is also possible to dissolve further ligands in (A) the hardening agent for the polyaddition (e.g. amine), which activate the accelerator, such as, for example a Cu(II) salt.

In a preferred embodiment of the invention, the first section A1, in particular the first chamber K1, further contains at least one more reactive thinner for the radically polymerizable compound. With this, it is possible to adjust the viscosity of the radically polymerizable compound to a desired value.

The mixing ratio of the first section to the second section A1:A2 depends, in the first place, on the components used, and, in the second place, on the area of application, in which the packaging according to the invention is to be used. It can be adjusted in the range from 1:1 to 10:1, preferably 3:1 to 7:1. In the area of fastening technology, it has proved to be advantageous to adjust the mixing ratio A1:A2 so that it amounts to 3:1 or 5:1 for most applications of a hybrid adhesive as a mortar material for chemical fastening purposes.

If a first chamber K1 and a second chamber K2 are provided in a first section A1, advantageously the mixing ratio from the first chamber K1 to the second chamber K2 amounts to 4:1 to 1:4, in particular 4:1 to 1:1.

The packaging according to the invention contains many degrees of freedom, in order to adjust the just mentioned mixing ratios A1:A2 and K1:K2. However, the HAV value (amine equivalent weight) of the amine has the greatest influence on the two ratios in case of using an epoxy amine system as compound polymerizable by polyaddition. By selecting an amine with a greater HAV value, it is possible to increase the portion of the second chamber K2, which contains (A) the amine and (c) the accelerator, in such a way that it is possible to vary the ratio A1:A2. However, the ratio of the compound reacting with an amine to the amine and the ratio of the radically polymerizable compound to the compound reacting with an amine have an influence on the mixing ratios A1:A2 and K1:2.

In a particularly preferred embodiment of the invention, the three-component packaging is a film-wrapped pack with a first film bag Fb1, which contains at least three individual components of the multi-component adhesive, and a second film bag Fb2, which contains at least two individual components of the multi-component adhesive, the individual components of the multi-component adhesive being distributed into the two film bags Fb1 and Fb2 in such a way that hardening of the adhesive takes place only after complete mixing of the individual components and a premature reaction between the individual components is prevented.

The advantage of the film-wrapped pack according to the invention is that it can be used in conventional and frequently used distributing devices.

The film-wrapped pack is particularly suited for hybrid adhesives based on a dual-hardening multi-component adhesive system, in particular for storage of the hybrid adhesive described in the application EP10153243.

In a preferred embodiment, the film-wrapped pack according to the invention further includes a head part, with at least two receiving sections in each case for one end of a film-wrapped pack. In particular, the film bags with their corresponding ends are permanently attached to the head part and thus unlosable connected with it. Therefore, the entire film-wrapped pack can be easily inserted into the mounting of a distributing device and removed from it. It is advantageous to glue the film bags on the head part. For example head parts usable according to the invention are described in applications DE 102007000802 A1, and DE9100054 U1.

The dimensions of the film-wrapped pack essentially correspond to the dimensions of a film-wrapped pack for two-component materials, so that the film-wrapped pack according to the invention can be used with conventional distributing devices already on the market, of course it being possible for slight adjustments to be necessary. Depending on the nature and requirements of the material introduced in the film-wrapped pack, it is possible to provide the components in the corresponding ratio to one another in the film-wrapped pack.

Reference is made to the not previously published application EP10153243, the content of which is herewith accepted in this application, with respect to the composition of the hybrid adhesive.

How the HV value of the amine hardener, the ratio of epoxy to amine, and the ratio of epoxy to vinyl ester can influence the mixing ratio A1:A2≈3:1 will be explained by means of the following empirical examples.

EXAMPLES

The composition of a first hybrid adhesive is as follows, the hybrid adhesive being based on Example 1 of the not previously published application EP10153243.

The following examples show that, above all, the HAV value of the amine hardener is an important level in the adjustment of the mixing ratio A1:A2=3:1. Examples 2 and 3 would be suited for achieving A1:A2=3:1 by an appropriate choice of the fillers and degree of filling of the individual components K1, K2, and the mixing ratio.

| | Starting formulation according to application EP101053243 | | | | | | |
|---|---|---|---|---|---|---|---|
| | | | | A1 + A2 + B | | | |
| | Starting formulation unfilled | | | Vol. A2, | | Vol. | Vol. |
| | Density | Weight | Volume | A2-B | Vol. A-B | A-B | A1-A2 |
| Components A1 (vinyl ester) | | | | | | | |
| BADGE-vinyl ester (assumption n = 0.1)$^{a)}$ | 1.16 | 19.38 | 16.71 | 44.27 | 58.69 | 1.31 | 3.07 |
| BDDMA$^{b)}$ | 1.02 | 12.85 | 12.60 | | | | |
| GlyMA$^{c)}$ | 1.08 | 16.16 | 14.96 | | | | |
| Components A2 (amine hardener) | | | | | | | |
| Dytek ® A$^{d)}$ | 0.86 | 12.40 | 14.42 | 14.42 | | | |
| Components B (epoxy/peroxy) | | | | | | | |
| BADGE standard resin (assumption n = 0.1) | 1.16 | 51.61 | 44.49 | 44.97 | 44.97 | | |
| Trigonox C$^{e)}$ | 1.05 | 0.50 | 0.48 | | | | |

$^{a)}$BADGE = bisphenol-A-diglycidyl ether
$^{b)}$BDDMA = butane diol-1,4-dimethacrylate
$^{c)}$GlyMA = glycidyl methacrylate
$^{d)}$Dytek ® A = 2-methyl pentamethylene diamine (Invista)
$^{e)}$Triginox ® C = tert.-butyl peroxybenzoate (AkzoNobel)

Example 1

The composition of Example 1 corresponds to the starting formulation, with the difference that an amine hardener with a density of 1 g/L and HAV 45 g/val was used instead of Dytek® A, and the epoxy:amine ratio was reduced, so that the ratio of vinyl ester:epoxy amounts to around 1:1 (epoxy resin reduced by 20%).

| | A1 + A2 + B | | | | | | |
|---|---|---|---|---|---|---|---|
| | | | | Vol. A2, | | Vol. | Vol. |
| | Density | Weight | Volume | A2-B | Vol. A-B | A-B | A1-A2 |
| Components A1 (vinyl ester) | | | | | | | |
| BADGE-vinyl ester (assumption n = 0.1) | 1.16 | 19.38 | 16.71 | 44.27 | 63.51 | 1.76 | 2.30 |
| BDDMA | 1.02 | 12.85 | 12.60 | | | | |
| GlyMA | 1.08 | 16.16 | 14.96 | | | | |

-continued

|  | A1 + A2 + B | | | | | | |
|---|---|---|---|---|---|---|---|
|  | Density | Weight | Volume | Vol. A2, A2-B | Vol. A-B | Vol. A-B | Vol. A1-A2 |
| Components A2 (amine hardener) | | | | | | | |
| Amine hardener HAV = 45[1] | 1.00 | 19.24 | 19.24 | 19.24 | | | |
| Components B (epoxy/peroxy) | | | | | | | |
| BADGE standard resin (assumption n = 0.1) | 1.16 | 41.29 | 35.59 | 36.07 | 36.07 | | |
| Trigonox C | 1.05 | 0.50 | 0.48 | | | | |

[1] e.g. EPIKURE ® 3200 or EPIKURE ® 3290 from the Hexion Specialty Chemicals Company Example 2

The composition of Example 1 corresponds to the starting formulation with the difference that an amine resin with a density of 1 g/L and HAV 90 g/val was used instead of Dytek®, the epoxy:amine ratio was reduced, so that the ratio of vinyl ester:epoxy amounts to around 1:1 (epoxy resin reduced by 20%), and that the amine portion was increased by 20%, in order to achieve a slight amine excess (20%) instead of a shortage (15%).

|  | A1 + A2 + B | | | | | | |
|---|---|---|---|---|---|---|---|
|  | Density | Weight | Volume | Vol. A2, A2-B | Vol. A-B | Vol. A-B | Vol. A1-A2 |
| Components A1 (vinyl ester) | | | | | | | |
| BADGE-vinyl ester (assumption n = 0.1) | 1.16 | 19.38 | 16.71 | 44.27 | 90.45 | 2.51 | 0.96 |
| BDDMA | 1.02 | 12.85 | 12.60 | | | | |
| GlyMA | 1.08 | 16.16 | 14.96 | | | | |
| Components A2 (amine hardener) | | | | | | | |
| Amine hardener HAV = 90[1] | 1.00 | 46.18 | 46.18 | 46.18 | | | |
| Components B (epoxy/peroxy) | | | | | | | |
| BADGE standard resin (assumption n = 0.1) | 1.16 | 41.29 | 35.59 | 36.07 | 36.07 | | |
| Trigonox C | 1.05 | 0.50 | 0.48 | | | | |

[1] e.g. EPIKURE ® 3046 or EPIKURE ® 3055 from the Hexion Specialty Chemicals Company Example 3

The composition of Example 1 corresponds to the starting formulation with the difference that an amine resin with a density of 1 g/L and HAV 110 g/val was used instead of Dytek®, the epoxy:amine ratio was reduced, so that the ratio of vinyl ester:epoxy amounts to around 1:1 (epoxy resin reduced by 20%), and that the amine portion was increased by 20%, in order to achieve a slight amine excess (20%) instead of a shortage (15%).

|  | A1 + A2 + B | | | | | | |
|---|---|---|---|---|---|---|---|
|  | Density | Weight | Volume | Vol. A2, A2-B | Vol. A-B | Vol. A-B | Vol. A1-A2 |
| Components A1 (vinyl ester) | | | | | | | |
| BADGE-vinyl ester (assumption n = 0.1) | 1.16 | 19.38 | 16.71 | 44.27 | 100.71 | 2.79 | 0.78 |
| BDDMA | 1.02 | 12.85 | 12.60 | | | | |
| GlyMA | 1.08 | 16.16 | 14.96 | | | | |

-continued

|  | A1 + A2 + B | | | | | | |
|---|---|---|---|---|---|---|---|
|  | Density | Weight | Volume | Vol. A2, A2-B | Vol. A-B | Vol. A-B | Vol. A1-A2 |
| Components A2 (amine hardener) | | | | | | | |
| Amine hardener HAV = 110[1] | 1.00 | 56.44 | 56.44 | 56.44 | | | |
| Components B (epoxy/peroxy) | | | | | | | |
| BADGE standard resin (assumption n = 0.1) | 1.16 | 41.29 | 35.59 | 36.07 | 36.07 | | |
| Trigonox C | 1.05 | 0.50 | 0.48 | | | | |

[1] e.g. EPIKURE ® 3061 or EPIKURE ® 3388 from the Hexion Specialty Chemicals Company

The invention claimed is:

1. A packaging for a multi-component adhesive, said packaging comprising:
    a first section which contains at least three individual components of the multicomponent adhesive,
    a second section located separate from the first section which contains at least two individual components of the multi-component adhesive,
    wherein the individual components of the multi-component adhesive are divided into the two sections in such a way that a reaction between the individual components is prevented and hardening of the adhesive takes place after mixing of the individual components,
    wherein the first section contains
        at least one radically polymerizable compound,
        at least one accelerator,
        at least one hardening agent for the polyaddition, and
    the second section contains
        at least one compound polymerizable by polyaddition, and
        at least one radical initiator.

2. The packaging of claim 1, wherein the at least three individual components of the multi-component adhesive are provided in the first section in at least two separate chambers.

3. The packaging of claim 2, wherein
    a first chamber contains
        the at least one radically polymerizable compound,
        optionally at least one inhibitor, and
        optionally at least one compound with two functional groups, of which one can (co)polymerize radically and the other by polyaddition, and
    a second chamber contains
        the hardening agent for the polyaddition, and
        the at least one accelerator.

4. The packaging of claim 3, wherein the first chamber of the first section further contains at least one more reactive thinner for the radically polymerizable compound.

5. The packaging of claim 1, wherein a mixing ratio of the first section to the second section is between 1:1 and 10:1.

6. The packaging of claim 5, wherein the mixing ratio of the first section to the second section is 3:1 or 5:1.

7. The packaging of claim 2, wherein a mixing ratio of the first chamber to the second chamber is between 4:1 and 1:4.

8. The packaging of claim 7, wherein the mixing ratio of the first chamber to the second chamber is between 4:1 and 1:1.

9. The packaging of claim 1, wherein
    the at least one compound polymerizable by polyaddition is an epoxy compound,
    the at least one hardening agent for the polyaddition is an amine.

10. The packaging of claim 1, wherein the packaging is a film-wrapped pack with a first film bag and a second film bag.

11. The packaging of claim 10, wherein a head part with at least two mounting sections for one end of the film bags is further provided on the film-wrapped pack.

12. The packaging of claim 1, wherein the first section further contains
    at least one inhibitor.

13. The packaging of claim 1, wherein the first section further contains
    at least one compound with two functional groups, of which one can (co)polymerize radically and the other by polyaddition.

14. The packaging of claim 13, wherein the optional compound with two functional groups is a compound with two functional groups, of which one can radically (co)polymerize and the other being an epoxy group.

15. The packaging of claim 3, wherein the first chamber contains
    the at least one inhibitor.

16. The packaging of claim 3, wherein the first chamber contains
    the at least one compound with two functional groups, of which one can (co)polymerize radically and the other by polyaddition.

17. The packaging of claim 1, wherein the first section further contains
    at least one inhibitor, and
    at least one compound with two functional groups, of which one can (co)polymerize radically and the other by polyaddition.

* * * * *